United States Patent [19]

Beisch

[11] Patent Number: 4,463,990
[45] Date of Patent: Aug. 7, 1984

[54] SIMULATED WIRE WHEEL TRIM AND METHOD

[75] Inventor: Hans R. Beisch, North Amherstburg, Canada

[73] Assignee: NI Industries, Inc., Novi, Mich.

[21] Appl. No.: 526,265

[22] Filed: Aug. 24, 1981

Related U.S. Application Data

[63] Continuation of Ser. No. 015,632, Feb. 27, 1979, abandoned, which is a continuation-in-part of Ser. No. 885,672, Mar. 13, 1978, abandoned.

[51] Int. Cl.³ .............................................. B60B 7/04
[52] U.S. Cl. .............................. 301/37 SS; 29/159 A
[58] Field of Search ............ 301/37 SS, 37 R, 75-76, 301/78, 81, 83-84; 29/159 A, 159.02, 159.03

[56] References Cited

U.S. PATENT DOCUMENTS

| | | | |
|---|---|---|---|
| 442,043 | 12/1890 | Haslup | 301/81 |
| 2,698,768 | 1/1955 | McLeod | 301/37 SS |
| 2,709,113 | 5/1955 | Plotkin | 301/37 R |
| 2,709,114 | 5/1955 | Plotkin | 301/37 SS |
| 2,710,775 | 6/1955 | Buerger | 301/37 SS |
| 2,751,256 | 6/1956 | Adams . | |
| 2,792,261 | 5/1957 | Tell et al. . | |
| 3,174,803 | 3/1965 | Mulhern et al. | 301/37 SS |
| 3,268,262 | 8/1966 | Gonas et al. . | |
| 3,294,452 | 12/1966 | Schmidt et al. . | |
| 4,009,911 | 3/1977 | Apczynski | 301/37 SS |
| 4,178,043 | 12/1979 | Beisch et al. | 301/37 SS |

*Primary Examiner*—Charles A. Marmor
*Attorney, Agent, or Firm*—Harness, Dickey & Pierce

[57] ABSTRACT

A simulated wire wheel trim for vehicle wheels comprising an outer spoke retaining element having portions for positioning the wheel trim with respect to a vehicle wheel, an inner central hub member having spoke containment structure and a plurality of spokes supportably extending between the outer spoke retaining element and the central hub member. The spokes are clamped in the containment structure to prevent movement of the hub, and the containment structure has abutment portions which force the spokes into secure connection with the outer retaining element during assembly. A method of assembly is also disclosed.

7 Claims, 15 Drawing Figures

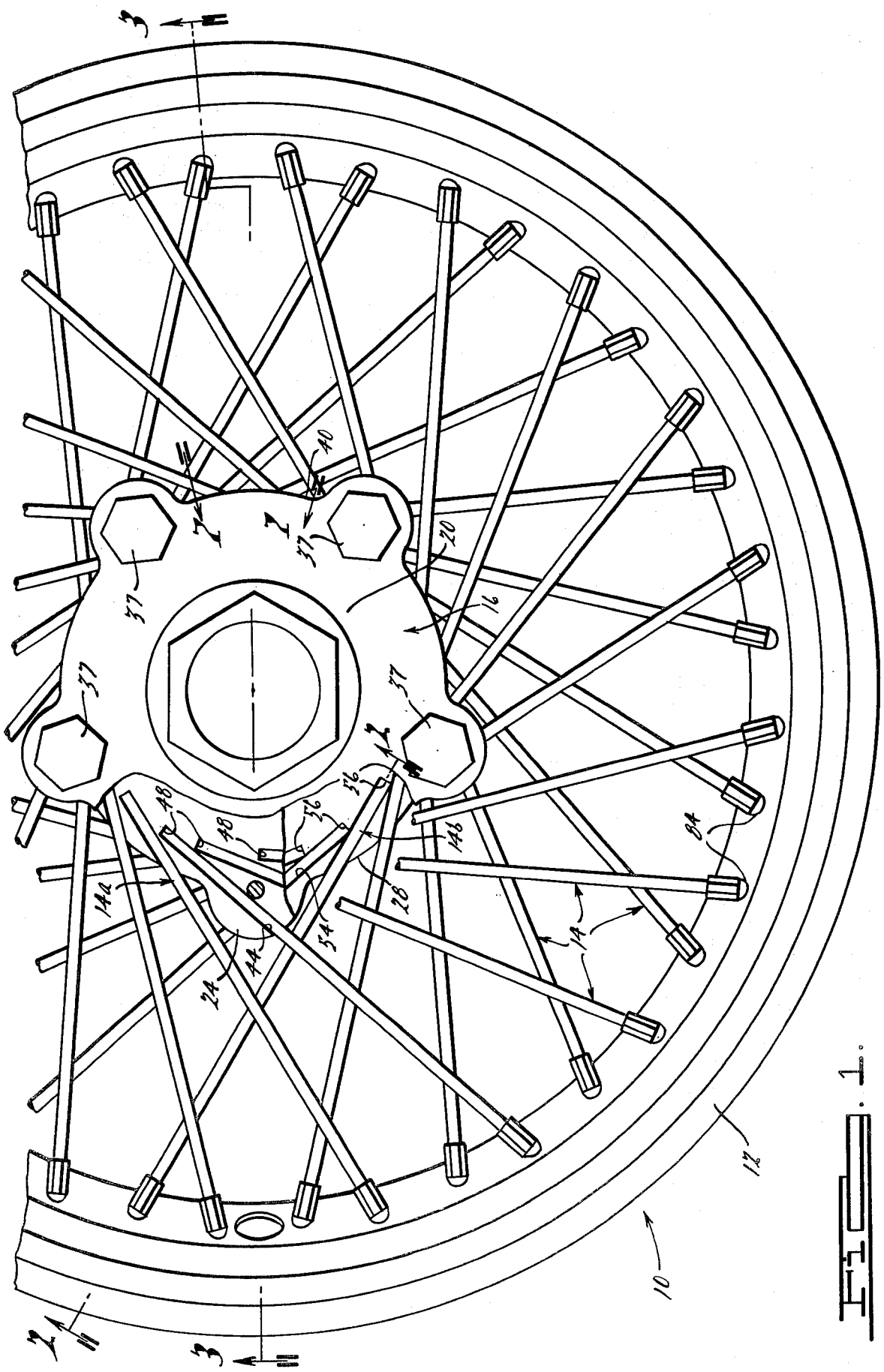

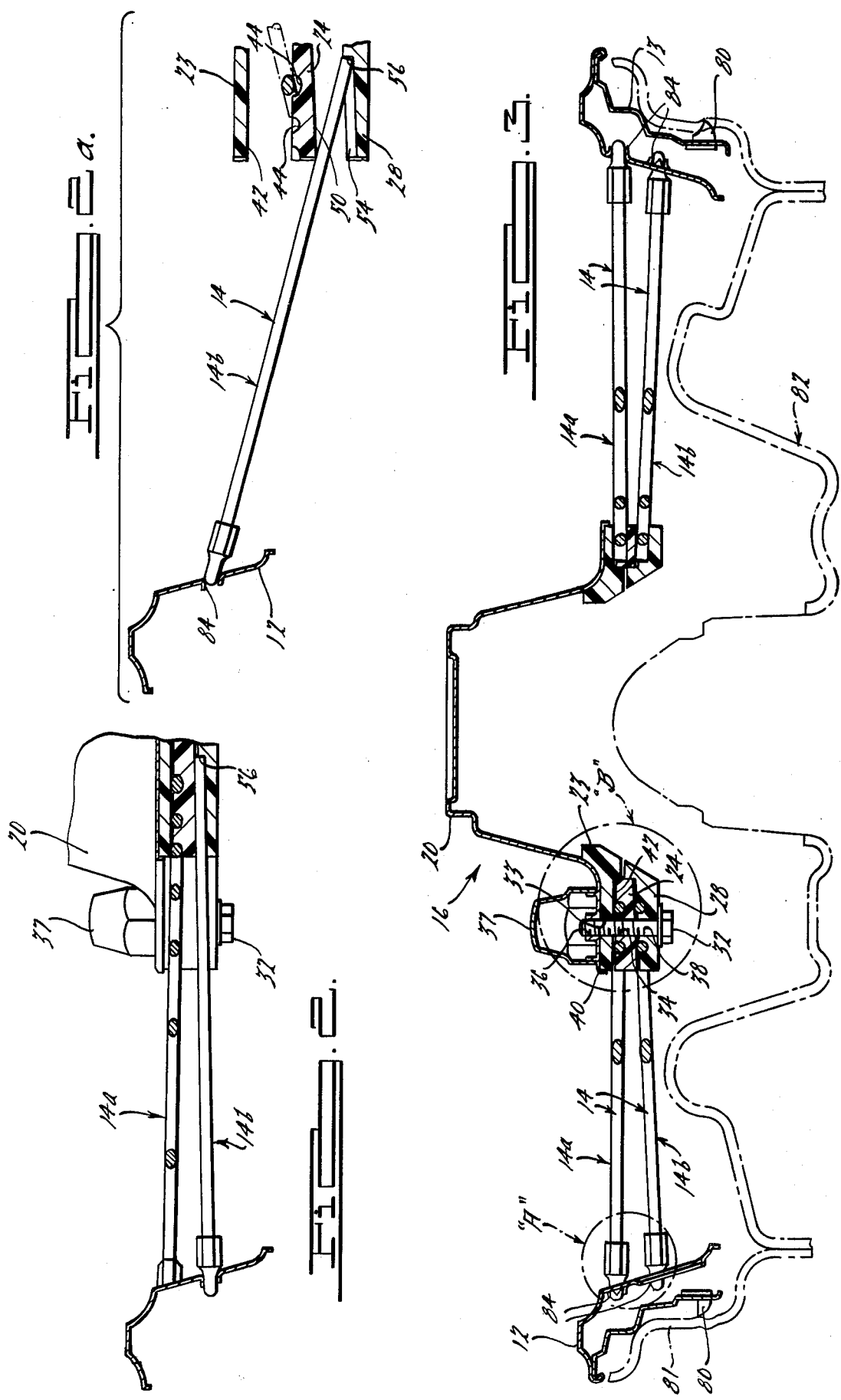

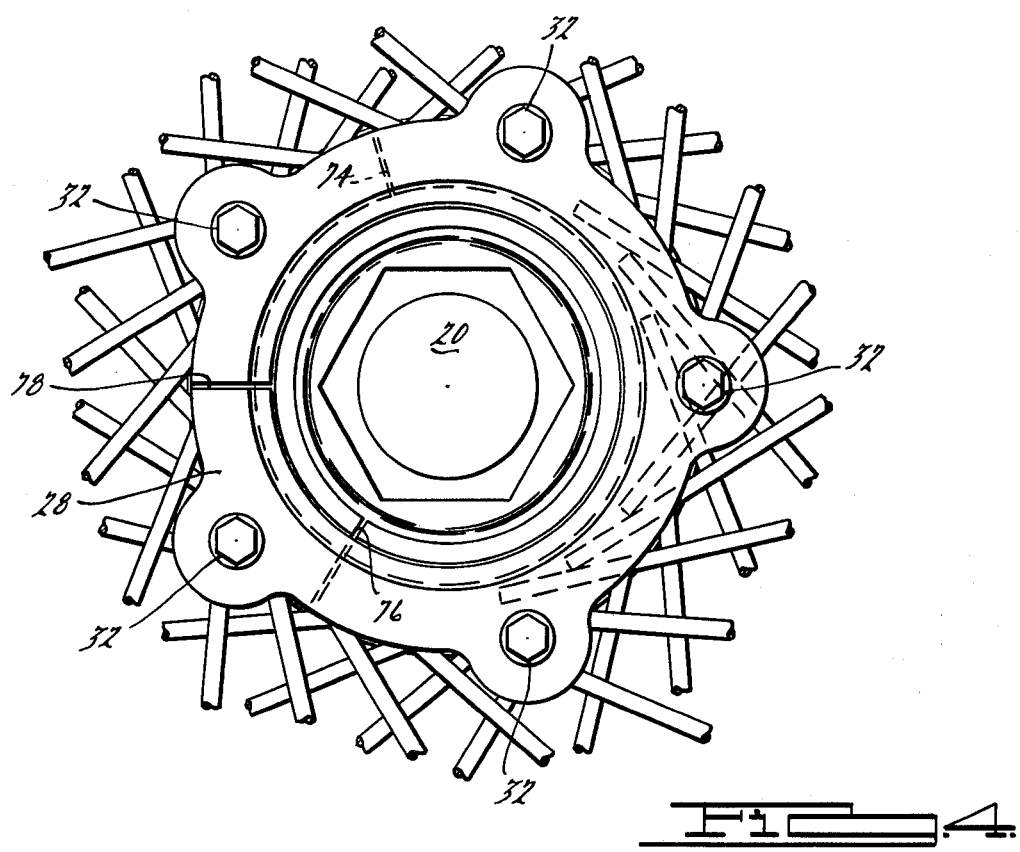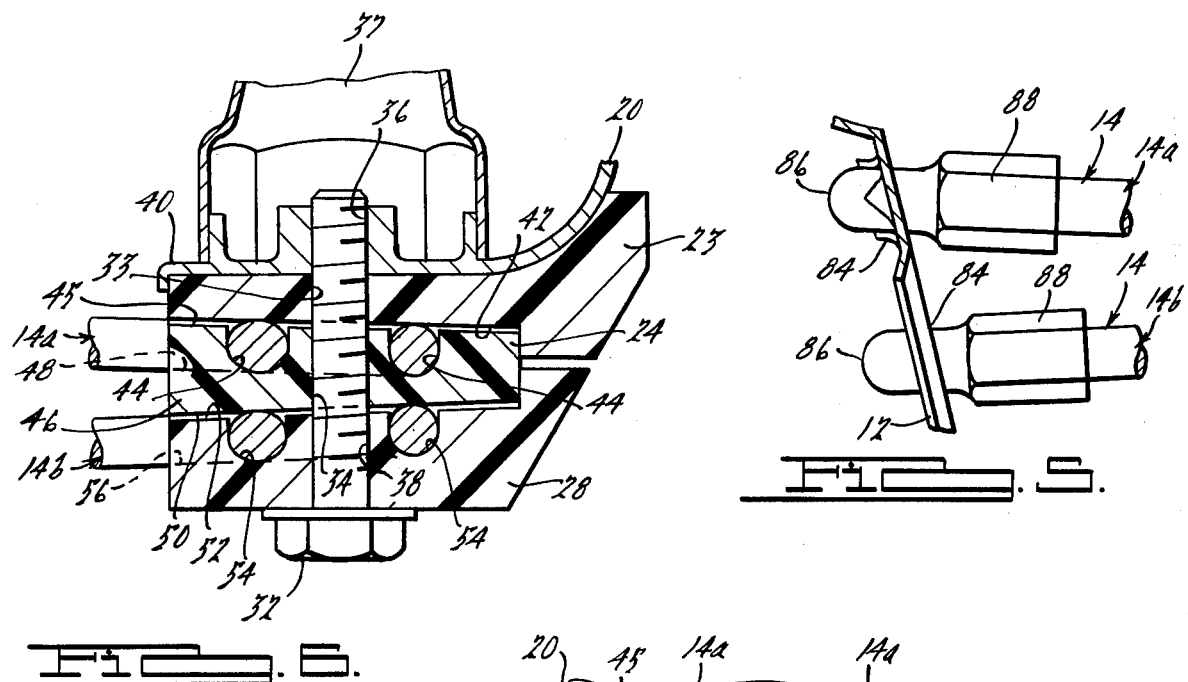

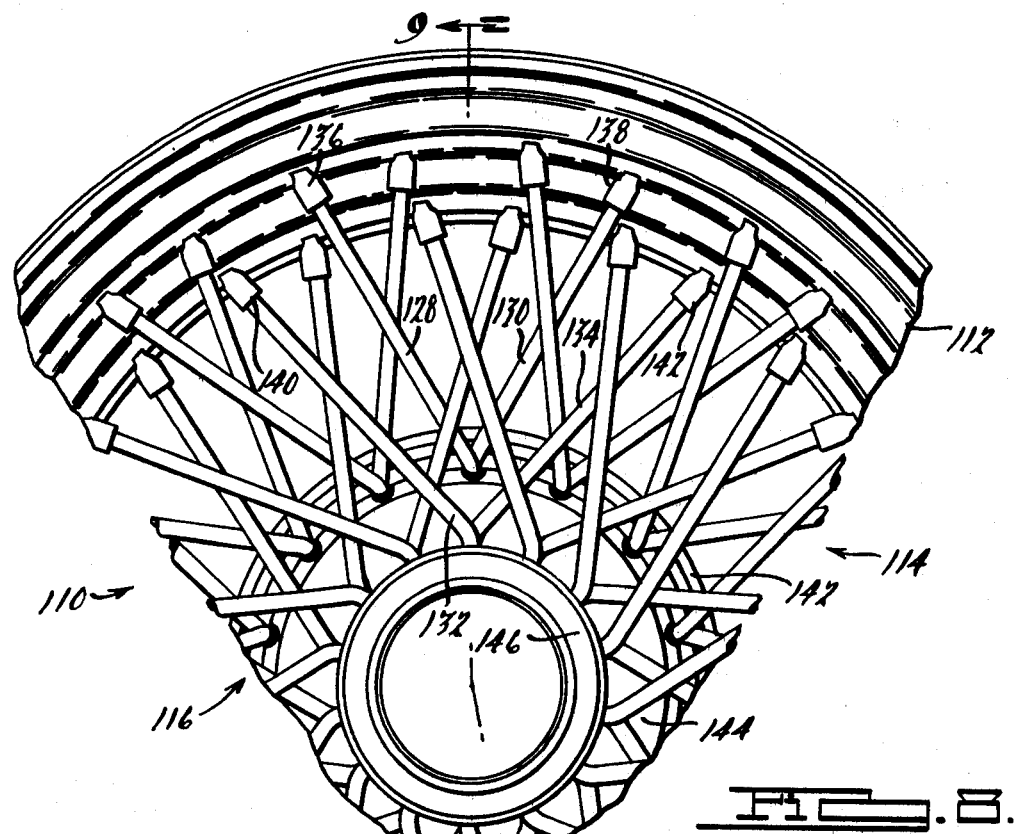
FIG. 8.
FIG. 9.
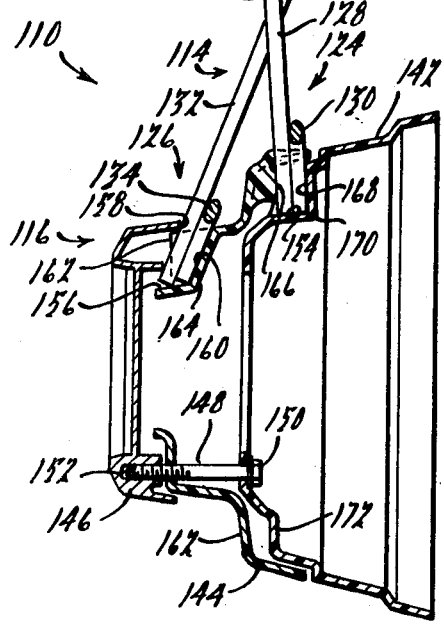
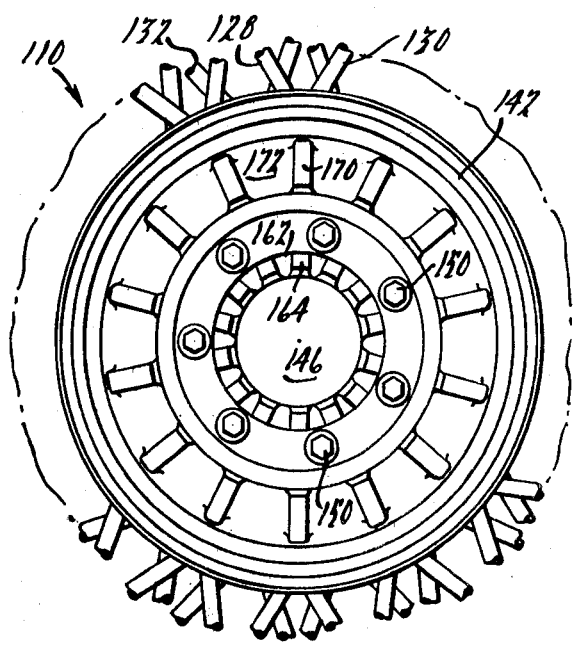
FIG. 10.

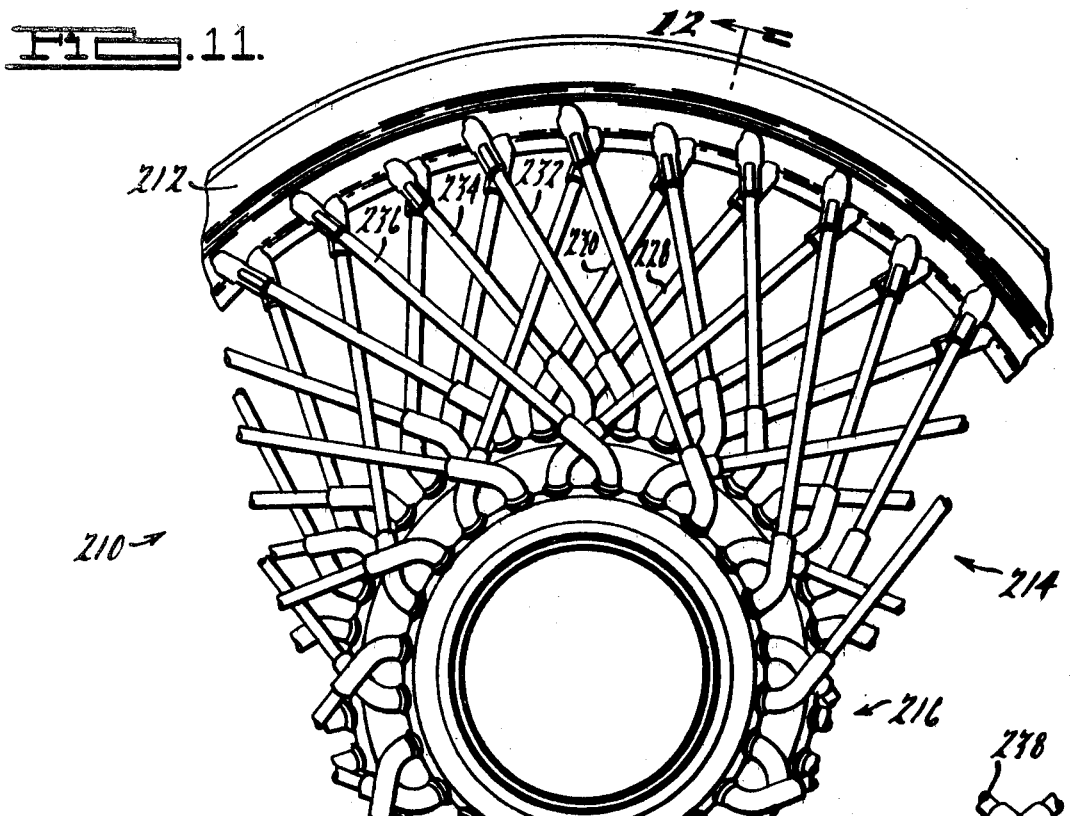
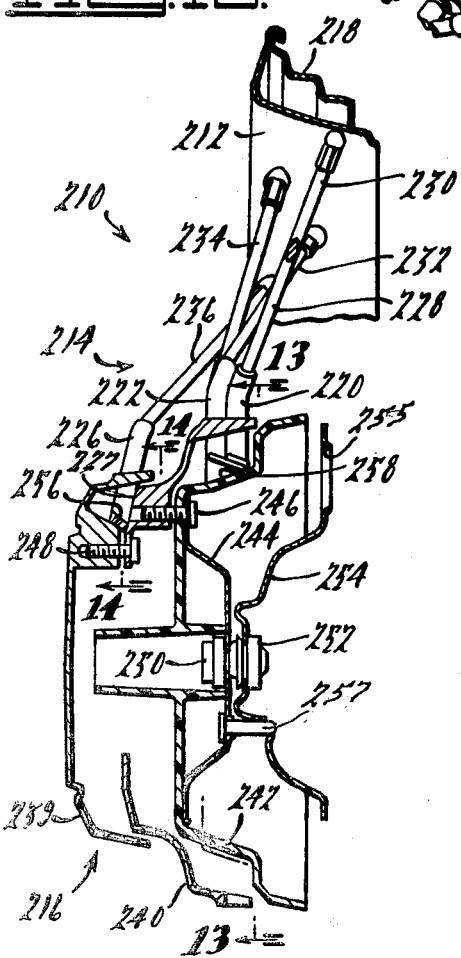
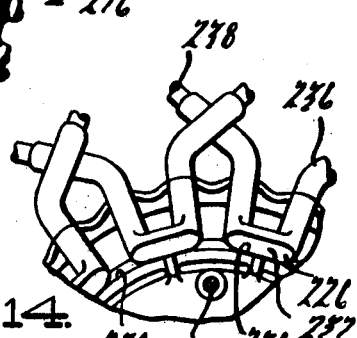
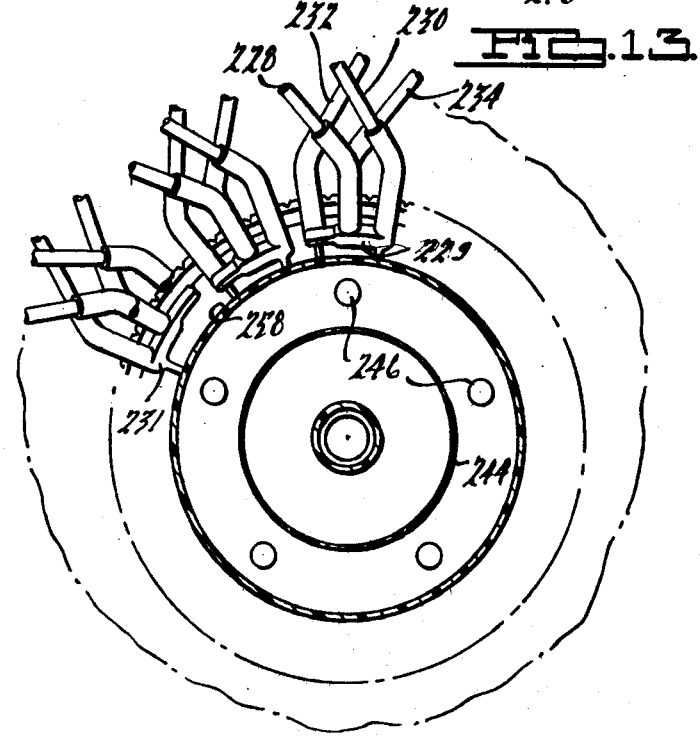

SIMULATED WIRE WHEEL TRIM AND METHOD

REFERENCE TO RELATED APPLICATION

This application is a continuation of U.S. Applicant Ser. No. 015,632, filed Feb. 27, 1979, now abandoned, which is a continuation-in-part of U.S. Application Ser. No. 885,672, filed Mar. 13, 1978, now abandoned.

BACKGROUND AND SUMMARY OF THE INVENTION

The present invention relates generally to simulated wire wheel trim for automotive vehicles, and particularly an improved construction and method of assembly of same.

Ever since the advent of the automobile, wire wheels have held a special attraction as providing an aesthetically pleasing decorative trim to the vehicle. The rapidly increasing popularity of sport and simulated sport vehicles has created a strong demand for wire wheels to obtain an overall aesthetically appealing vehicle. As vehicle weights and the speeds at which they may be driven began to increase, the structurally weak authentic wire wheels were gradually replaced by simulated wire wheel covers for use on the stronger steel flange-type wheels. Also, wire wheels are susceptible to misalignment and unbalance due to impact with road obstacles, whereas the conventional steel wheels are relatively impervious to such damage. Simulated wire wheel trim members have evolved to the present state where such wheel covers provide a remarkably authentic deep appearance which contributes significantly to the vehicle aesthetics.

In order to achieve this authentic appearance in a simulated wire wheel trim member, it is generally desirable to provide more than one layer of radial spokes in a relatively deep configuration in order to simulate the true depth of a wire wheel. However, simulated wire wheel covers heretofore known have generally included a backing member to support the hub, which has significantly increased the difficulty in providing the desired degree of visual depth in the wheel trim.

Accordingly, one object of the instant invention resides in the provision of a hub section having containment means for the spokes which is also supported by the spokes so that no backing member is required and a sense of depth can be obtained. The containment means retains several layers of spokes in a virtually unlimited number of design configurations, thereby demonstrating another object of this invention, namely to provide a great degree of manufacturing and design flexibility while providing a more realistic effect in simulating a wire wheel.

Another object of the invention concerns the provision of means and method of fabrication to preclude rattle and vibration at the terminal end portions of the wire spokes of a siumlated wire wheel cover.

Another object of this invention is to provide a very light-weight simulated wire wheel to contribute as little added weight as possible to the unsprung vehicle weight, so as to minimize any adverse effect on ride and fuel economy.

Yet another object of this invention is to provide an improved method of assembly which, in addition to having the aforementioned manufacturing and design flexibility, is simple, inexpensive and capable of being performed either manually or by an automatically controlled machine operation.

Another object of the instant invention concerns the provision of an improved wheel trim design that will withstand distortion due to changes in temperature and variant and shock loading normally encountered by wheel trim and reduce the risk of fracture by that distortion in normal operation.

Other objects and advantages of the instant invention will be apparent in the following specification, claims and drawings.

BRIEF DESCRIPTION OF THE DRAWINGS

FIG. 1 is an elevated view of a circular simulated wire wheel trim in accordance with an exemplary embodiment of the invention as viewed when looking in an axially inwardly direction, having portions thereof partially broken away;

FIG. 2 is a sectional edge view of the center containment means, spokes, and the outer retaining flange taken substantially along lines 2—2 of FIG. 1;

FIG. 2a is an exploded sectional view similar to FIG. 2 but with the elements of FIG. 2 disposed in an intermediate assembly position;

FIG. 3 is a sectional view taken generally along line 3—3 of FIG. 1;

FIG. 4 is an elevated view of the containment means portion of the present invention looking in an axially outwardly direction;

FIG. 5 is an enlarged view of the structure encompassed by the dashed circle "A" in FIG. 3;

FIG. 6 is an enlarged sectional view of the structure encompassed by the dashed circle "B" in FIG. 3;

FIG. 7 is an arcuate sectional view taken generally along line 7—7 of FIG. 1;

FIG. 8 is an elevated view, broken away, of an alternative embodiment of a circular simulated wire wheel trim of the present invention as viewed when looking in an axially inwardly direction;

FIG. 9 is a sectional view taken substantially along line 9—9 of FIG. 8;

FIG. 10 is an elevated view broken away, of the embodiment of FIG. 8 as viewed when looking in an axially outwardly direction;

FIG. 11 is an elevated view broken away of another alternative embodiment of a circular simulated wire wheel trim of the present invention as viewed when looking in an axially inwardly direction;

FIG. 12 is a sectional view taken substantially along line 12—12 of FIG. 11;

FIG. 13 is a sectional view taken along line 13—13 of FIG. 12; and

FIG. 14 is a sectional view taken along line 14—14 of FIG. 12.

DESCRIPTION OF THE PREFERRED EMBODIMENT

Referring now to FIGS. 1 and 3, an improved simulated wire wheel cover 10 embodying the principles of the instant invention is illustrated. Wheel cover 10 is comprised of an annular spoke retaining flange 12, a plurality of generally radially extending spokes, generally designated 14, and a central spoke containment means 16. The containment means is supported by the spokes. No backing member is required, as in the prior art.

The annular spoke retaining flange 12 has crimped about the outer periphery thereof a retention band 13 having a plurality of resilient retaining teeth 80. The retaining teeth 80 are preferably constructed and mounted as shown in U.S. Pat. No. 3,037,816, issued June 5, 1962, and assigned to the assignee of the present invention. The teeth 80 are engageable with an axially extending flange 81 of a vehicle wheel 82 in the conventional manner. The retaining flange 12 further has a plurality of axially spaced rows of circumferentially spaced apertures, generally designated 84. Although two rows of apertures 83 are shown in the illustrated embodiment, the invention is not limited to that number, but may be any number of rows depending on how many layers of spokes will be used in a particular design configuration.

The radially extending spokes 14 are disposed in the apertures 84, respectively. As shown in FIG. 5, the radially outermost portion of each spoke 14 has a rounded end 86 and a simulated nut 88 disposed radially inwardly therefrom. Referring again to FIG. 1, the spokes 14 are canted relative to the spoke retaining flange 12, the degree of cant being a matter of design. When the apparatus herein described is finally fabricated, the edges or peripheries of the apertures 84 will bitingly engage the ends 86 of the spokes 14, respectively, to minimize rattle.

Referring to FIGS. 1 and 3, the containment means 16 in the preferred embodiment comprises a hub 20 to which is attached a hub-engaging annular spoke retainer ring 23 and two other annular spoke retainer rings, designated 24 and 28, respectively, by bolt fasteners 32. The bolt fasteners 32 traverse the annular retainer rings 23, 24 and 28 in an axial direction through alignment holes 33, 34 and 38, terminating in holes 36 in hub 20. A plurality of bolt fasteners 32 and holes 33, 34, 36 and 38 are equally spaced circumferentially around the retainer rings 23, 24 and 28 and the hub 20.

Ornamental bosses 37 are attached to hub 20 in a conventional manner to conceal the ends of the bolts 32. The bosses 37 simulate wheel nuts in this embodiment, and are equally spaced circumferentially along the axially outward surface of a radially extending flange 40 on the perimeter of the hub 20. The axially inward surface of the hub flange 40 engages retainer ring 23 which has a spoke support surface 42. To provide for a lightweight wheel cover of easily varied design, the hub 20 and spoke retainer rings 23, 24 and 28 are preferably made of a strong and durable plastic material.

As shown in FIGS. 6 and 7, the first layer of spokes, designated 14a, is disposed adjacent to spoke support surface 42 of retainer ring 23. Annular spoke retainer ring 24 is adjacent and aligned with the radially inner portions of layer 14a of spokes 14. The retainer ring 24 has grooves, generally designated 44, in a spoke support surface 45, extending from the radially outward edge 46 of the retainer ring 24 to a spoke abutment portion 48, as seen in FIG. 1, along the radially inner section of the retainer ring 24. The grooves 44 are angularly related to the radius of the retainer ring 24 so as to align and contain the spokes 14 respectively in layer 14a of spokes 14.

The next layer of spokes, indicated at 14b, is disposed adjacent to an axially inward support surface 50 of the retainer ring 24. Annular retainer ring 28, also having grooves, generally designated 54 and extending across a spoke support surface 52, has a radially inwardly located spoke abutment portion 56, as seen in FIGS. 1 and 2, disposed adjacent to and aligned with the radially inner portions of the spokes 14 of layer 14b.

The number of retainer rings and the number of layers of spokes may vary in order to give the desired appearance. In the exemplary embodiment shown, each layer of spokes 14 is canted relative to a true radius from the central axis of the wheel cover, and the spokes 14 in layer 14a are canted oppositely to spokes 14 in layer 14b. The grooves 44 and 54 in retainer rings 24 and 28 respectively reflect the canting in opposite directions.

Another feature of the invention is best shown by FIG. 7. When fully assembled, the preferred embodiment has clearance 70 between support surfaces 42 and 45 and clearance 72 between support surfaces 50 and 52. The clearances 70 and 72 are accomplished by having the depth of the grooves 44 and 54 less than the diameter of one of the radially inner portions of the spokes 14. This assures that when the containment means 16 is secured all of the spokes will be tightly clamped in position.

FIGS. 2 and 4 illustrate another feature of the invention. The annular retainer rings 23, 24 and 28 are split radially at 76, 74 and 78 respectively. This discontinuity permits the retainer rings 23, 24 and 28 to expand to withstand distortion due to chages in temperature and the variant loading and shock forces encountered by the wheel trim in normal operation.

Thus it is readily apparent that the present invention provides an improved construction for simulated wire wheel covers which substantially simplifies manufacturing, provides almost unlimited design flexibility, improves the authenticity of appearance to be more aesthetically appealing, and maintains a secure, durable, rattle-free assembly.

Referring to FIGS. 2 and 2a, a preferred method of fabrication of the present wheel trim is illustrated. The annular spoke retaining flange 12 is placed in a fixture (not shown) at the commencement of the method. Said fixture also has a portion centrally disposed onto which annular retainer ring 28 is set with the grooves 44 of said ring 28 facing in a direction away from the fixture. The fixture may be one part or several separate parts. The ring 28 and flange 12 are positioned concentrically when engaged to said fixture. But the plane formed by said flange 12 is parallel to and not identical to the plane formed by said ring 28. The ring 28 is disposed below the plane of said flange 12 at the commencement of the illustrated process, as shown.

As seen in FIG. 2a, the next steps set the radially outer ends of a first layer 14b of spokes 14 in the corresponding layer of apertures 84, respectively. The radially inner portions of the spokes 14 in layer 14b are canted with respect to a true radius of the retaining flange 12 and arranged within the grooves 54, against abutment portions 56, of the annular retainer ring 28, respectively, which are correspondingly canted. Subsequently, the annular retainer ring 24 at surface 50 is placed on top of the radially inner portions of the spokes 14 in layer 14b. Also, alignment holes 34 of said retainer ring 24 are positioned in concentricity with alignment holes 38 of said retainer ring 28, seen more specifically in FIG. 6.

In the embodiment illustrated, the radially outer ends of a second layer 14a of spokes 14 is set into a corresponding layer of apertures 84 in the spoke retaining flange 12, respectively. The radially inner portions of the spokes 14 in layer 14a are arranged within the grooves 44, against abutment portions 48, of the annular retainer ring 24, respectively. The spokes 14 of layer 14a are also angularly canted relative to the radius of the retaining flange 12. To add to the effect of axial depth in the finished product along with the absence of a backing plate, the spokes 14 of layer 14a may be canted in an opposite direction of the spokes 14 in layer 14b. The grooves 44 in retainer ring 24 are canted to correspond to and confine the radially inner portions of the spokes 14 in layer 14a.

A number of subsequent layers of spokes 14 may be included in the fabrication by simply including a corresponding row of apertures 84 in the retaining flange 12 and repeating the above steps with a corresponding number of spokes 14 and an additional corresponding annular retainer ring.

Subsequently, in the preferred method, annular spoke retainer ring 23 at surface 42 is placed on top of the radially inner portions of the spokes 14 in layer 14a. Alignment holes 33 are positioned in concentricity with alignment holes 34 and 38. Hub 20 is then set onto ring 23 with holes 36 aligned with holes 33, 34 and 38.

Bolt fasteners 32 are inserted through alignment holes 33, 34 and 38 into holes 36 to secure together the retainer rings 23, 24 and 28, the layers 14a and 14b of spokes 14, and the hub 20. However, the bolts can be connected by inserting them through the hub and having fastening means within or at retainer ring 28 and still be within the scope of the invention. As the bolt fasteners 32 are tightened, the hub 20 will move along the central axis of the retaining flange 12 toward the horizontal plane formed by said retaining flange 12. As the hub 20 moves axially, the abutment portions 48 and 56 of retainer rings 24 and 28, respectively, force the spokes 14 of layers 14a and 14b, respectively, radially outwardly into secure confinement within the corresponding apertures 84, respectively, of the spoke retaining flange 12. The bolt fasteners 32 are tightened until the retainer rings 24 and 28 are situated within the disk-like space formed within said retaining flange 12 and the entire containment means 16 is securely supported in all directions, as shown in FIG. 2. The ornamental bosses 37 can be attached in any conventional manner to the hub 20 above the ends of bolt fasteners 32 at any time during the method.

Two advantages of the above method are the relatively few parts needed, other than the spokes, and the simplicity involved so that it can be readily performed either manually or by an automatically controlled machine operation. Also, a great deal of design flexibility exists with very minor modification of the method steps.

The illustrated method is not meant to limit the scope of the invention solely to the disposition of the ring 28 below the plane of the flange 12 at the commencement of the process. The grooves 44 and 54 may be disposed in spoke support surfaces 42 and 50 in retainer rings 23 and 24 and accomplish the same results when the commencement of the process occurs above the plane of the flange 12. Furthermore, the process may be inverted so that the spokes may be arranged against a surface without grooves after which a retainer ring would be placed onto the layer of spokes and the grooves aligned with the radially inner portions of the layer of spokes. The clamping action resulting from the fasteners being secured will move the containment means 16 from an initial plane to a second plane, usually toward the plane of the retaining flange 12, regardless of the initial disposition of said containment means 16. The final disposition of the containment means 16 with respect to the retaining flange 12 in an axial direction is determined by the position of the abutment portions in the grooves and the slope of the grooves. The grooves may be sloped along the length of each groove either from its radially inner portion downward to the radially outer portion or vice-versa, depending on the combination desired.

Now referring to FIGS. 8-10 an alternative embodiment of a wheel trim of the present invention is illustrated as wheel cover 110. Wheel cover 110 has a greater depth of spokes than the previously disclosed embodiment and comprises, in general, annular spoke retaining flange 112, a plurality of generally radially extending spokes 114, and central spoke containment means 116.

Crimpingly attached at 118 to spoke retaining flange 112 is retention band 120 which has a plurality of circumferentially spaced and radially outwardly extending teeth 122 which are adapted to retain wheel cover 110 on an associated wheel (not shown in the Figures) in a conventional manner.

Wheel cover 110 is provided with a plurality of generally radially extending spokes 114 supportably extending between annular spoke retaining flange 112 and spoke containment means 116. Spokes 114 comprise a plurality of circumferentially spaced lower spoke clusters 124 and a plurality of circumferentially spaced upper spoke clusters 126. Each lower spoke cluster 124 has a pair of lower spoke members 128 and 130 which are canted at a substantial angle from the true radius of wheel cover 110 and also are canted slightly with respect to each other, i.e. are not coplanar with respect to each other to provide a greater visual depth to wheel cover 110. Of course, it will be appreciated that the exact degree of canting is a matter of design. Each upper spoke cluster 126 has a pair of upper spoke members 132 and 134 which are also canted at a substantial angle from the true radius of wheel cover 110 and also are canted slightly with respect to each other to provide even greater visual depth wheel cover 110. The radially outer end portions of spoke members 128, 130, 132 and 134 are disposed in annular spoke retaining flange 112 in a manner analogous to the previous embodiment and have integral simulated nut portions 136, 138, 140 and 142 respectively, which are disposed adjacent annular spoke retaining flange 112.

The plurality of generally radially extending spokes 114 each have radially inwardly extending portions which are clampingly retained within central spoke containment means 116. Central spoke containment means 116 comprises lower casting 142, middle casting 144 and top casting 146. Lower casting 142 and middle casting 144 have a generally dish-shaped, annular configuration and are preferably made of lightweight plastic material. Top casting 146 generally is dish shaped and preferably made of metallic material so that the axially outermost part of wheel cover 110 is resistant to strikes from stones or other small objects encountered during use. Middle casting 144 is clampingly secured between lower casting 142 and top casting 146 by means of a plurality of circumferentially spaced bolt fasteners 148 each having a headed end 150 on the axially inner side of lower casting 142 and a threaded end portion which threadably engages an aligned threaded bore 152 in top casting 146.

Upper spoke members 132 and 134 are clampingly retained between top casting 146 and middle casting 144 while lower spoke members 128 and 130 are clampingly retained between middle casting 144 and lower casting 142 in consequence of the tightening of the plurality of bolts 148. Middle casting 144 has a plurality of circumferentially spaced radially extending troughs 164 adapted to receive the radially inner portions of upper spoke members 132 and 134. Circumferentially adjacent each trough 164 is a radially extending rib 162. Thus, as best shown in FIG. 10, as viewed in an axially outward direction, troughs 164 and ribs 162 are alternately circumferentially spaced around the radially inner periphery of middle casting 144. As best shown in FIG. 9, the radially inner portions of upper spoke members 132 and 134 are clamped within chute 160 between axially inwardly facing edge 158 of top casting 146 and axially outwardly facing surface 160 of trough 164. The radially inwardly facing ends of upper spoke members 132 and 134 lie in abutting relationship to radially outwardly facing surface 156 of middle casting 144 defining the radially inner end of trough 164. In a manner similar to the upper spoke members 132 and 134, lower spoke members 128 and 130 are clampingly retained between middle casting 144 and lower casting 142. Thus, lower casting 142 has a plurality of radially aligned troughs 170 with circumferentially adjacent radially extending ribs 172. The radially inner portions of lower spoke members 128 and 130 are clampingly retained in trough 170 between axially inwardly facing surface 166 of middle casting 144 and axially outwardly facing surface 168 of trough 170. The radially inwardly facing ends of spoke members 128 and 130 lie in abutting relationship against radially outwardly facing surface 154 of lower casting 142 which defines the radially inner end of trough 170.

Wheel cover 110 can be made by a method analogous to that disclosed with respect to the method of making wheel cover 10. Thus, in fabrication of wheel cover 110, each radially outer end of lower spoke members 128 and 130 is inserted into the proper aperture in spoke retaining flange 112. Next, the radially inner portions of lower spoke members 128 and 130 are placed in the proper trough 170 and proximate to abutment surface 154 of lower casting 142 which is axially displaced from the plane of spoke retaining flange 112 which is mounted on a suitable fixture. Then, middle casting 144 is located with respect to lower casting 142 and the radially outer ends of upper spoke members 132 and 134 are inserted into the proper apertures in retaining flange 112 and the radially inner ends are placed in the proper trough 164 with ends proximate to surface 156. Finally, top casting 146 is located on middle casting 144 and top casting 146, middle casting 144 and lower casting 142 are clamped together by tightening the plurality of bolt fasteners 148 causing the radially inner ends of upper spoke members 132 and 134 and lower spoke members 128 and 130 to abut against surfaces 156 and 154.

Now referring to FIGS. 11-14, another alternative embodiment of the present invention is illustrated and indicated generally as wheel cover 210. Wheel cover 210 has an even greater depth of spokes than either of the previously disclosed embodiments of the present invention and comprises annular spoke retaining flange 212, a plurality of generally radially extending spokes 214 and central spoke containment means 216.

Crimpingly attached to the radially outer circumference of annular spoke retaining flange 212 is positioning ring 218 which is adapted to come into abutting relationship with the wheel to position wheel cover 212 with respect thereto when a centrally located bolt 250 is threadably attached to central hub member 254 which is attached by a plurality of apertures 255 to lug nuts of an associated wheel. It will, of course, be appreciated that positioning ring 218 can laternately have teeth or other biting or other retention means located thereon, and if such retention means is sufficient by itself for retention of wheel cover 210 on an associated wheel, then no centrally located bolt 250 or central hub member 254 is necessary.

Spokes 214 comprise a plurality of circumferentially spaced, generally radially extending lower spoke clusters 220, middle spoke clusters 222 and upper spoke clusters 226 which supportably extend between annular spoke retaining flange 212 and central spoke containment means 216. Each lower spoke cluster 220 has a pair of lower spoke members, 228 and 230, which are canted at an angle from the true radius of wheel cover 210 and with a web portion 229 joining their axially inner ends. Each middle spoke cluster 222 is of similar construction having a pair of spoke members 232 and 234 canted at an angle from the true radius of wheel cover 210 and with a web portion 231 joining their axially inner ends. It will be noted that lower spoke members 228 and 230 are canted to one side of the true radius which middle spoke members 232 and 234 are canted to the other side. Upper spoke cluster 226 also has a pair of upper spoke members 236 and 238 each canted to one side of the true radius and having axially inner ends joined by web portion 237.

The radially outer end portions of spoke members 228, 230, 232, 234, 236 and 238 are disposed in annular spoke retaining flange in a manner analogous to the previous embodiments and have analogous simulated nut portions. The radially inner end portions of the spoke members are clampingly retained within central spoke containment means 216 which comprises spoke retainer 242, lower casting 240 and top casting 239. Top casting 239 can have a centrally disposed aperture therein (not shown in the Figures) to provide access to centrally located bolt 250 and a retainer plate 244 can be attached by a plurality of circumferentially spaced bolts 246 to spoke retainer 242. Retainer plate 244 has a central aperture through which bolt 250 extends to engage a nut 252 which is staked or otherwise attached to central hub member 254. An anti-rotation pin 257 can extend through aligned apertures in retainer plate 244 and central hub member 254 to prevent relative rotation of wheel cover 210 with respect to central hub member 254. A plurality of circumferentially spaced bolts 248 attach lower casting 240 to top casting 239 while a plurality of circumferentially spaced bolts 246 attach spoke retainer 242 to middle casting 240.

As shown in FIGS. 12 and 14, the web portion 237 of upper spoke cluster 226 is in abutting relationship to radially outwardly and axially inwardly facing surface 256 of top casting 239 and is held thereagainst by surface 227 of lower casting 240. As shown in FIGS. 12 and 13, middle and lower spoke clusters 222 and 220 have web portions 229 and 231 respectively which nest with each other and lie in abutting relationship against radially outwardly and axially outwardly facing surface 258 of spoke retainer 242. Web portion 229 of lower spoke cluster 220 is held thereagainst by web portion 231 of middle spoke cluster 222 which is held thereagainst by lower casting 240.

As will be readily appreciated by those skilled in the art, the method of making wheel cover 210 is analogous to the method previously disclosed. Thus, retaining flange 212 is mounted on a fixture and lower spoke clusters 220 are located with respect to spoke retaining flange 212 and spoke retainer 242, which is axially displaced from the plane of retaining flange 212. Then middle spoke clusters 222 are placed in position followed by lower casting 240, upper spoke clusters 226 and finally top casting 239 and the plurality of bolts 246 and 248 are tightened to cause the containment means to move toward the plane of the spoke retaining flange 212 whereby the radially inner ends of upper, middle and lower spoke clusters are urged against surfaces 256 and 258 and the radially outer end portions of spoke members 228, 230, 232, 234, 236 and 238 are urged radially outwardly against spoke retaining flange 212.

Thus, there is disclosed in the above description and in the drawings embodiments of the invention which fully and effectively accomplish the objects thereof. However, it will be apparent that variations in the details of the apparatus and the method may be indulged in without departing from the sphere of the invention herein described, or the scope of the appended claims.

What is claimed is:

1. Wheel trim for attachment to the outer face of a vehicle wheel comprising:
    an annular retainer flange having means for engaging said vehicle wheel, said retainer flange having a spoke retainer flange portion with at least one row of a plurality of circumferentially spaced generally circular apertures;
    at least one layer of a plurality of generally radially extending spokes;
    a hub having a radially outwardly extending support flange;
    spoke retainer means attached to said hub at said support flange, comprising at least two annular spoke retainer rings positioned axially adjacent on opposite sides of the radially inner portion of the corresponding layer of said spokes,
        having a plurality of circumferentially spaced grooves on one support surface extending from the radially outer edge of one of said retainer rings to a radially inner spoke abutment portion of said same retainer ring, said grooves engaging said radially inner portions of said spokes,
        each groove having a depth less than the diameter of the radially inner portion of the spoke disposed therein; and
    fastener means to secure said radially inner portions of said spokes, said spoke retainer means, said spoke retainer ring, and said hub together.

2. Wheel trim for attachment to the outer face of a vehicle wheel comprising
    an annular retainer flange having means for engaging said vehicle wheel, said retainer flange having a spoke retainer flange portion with at least one row of a plurality of circumferentially spaced apertures;
    at least one layer of a plurality of generally radially extending spokes,
        said spokes having radially outer portions with rounded ends, with simulated nuts positioned radially inward from said rounded ends,
        said radially outer portions connected to said retainer flange with said rounded ends inserted in said apertures, respectively;
    a hub having a radially outwardly extending support flange;
    an annular spoke retainer ring attached to said hub at said support flange;
    spoke retainer means comprising a radially split annular spoke retainer ring for each layer of said spokes, positioned axially adjacent to the radially inner portion of the corresponding layer of said spokes,
        having a plurality of circumferentially spaced grooves on one support surface extending from the radially outer edge of said retainer ring to a radially inner spoke abutment portion of said retainer rings, said grooves engaging said radially inner portions of said spokes,
        each groove having a depth less than the diameter of the radially inner portion of the spoke disposed therein; and
    fastener means to secure said radially inner portions of said spokes, said spoke retainer means, said spoke retainer ring, and said hub together.

3. A wheel structure in accordance with claim 1, wherein said spokes are angularly related to the central axis of the circular apertures in said spoke retainer flange portion so as to cant said spokes relative to said spoke retainer flange whereby the peripheries of the apertures bitingly engage said tapered ends of said spokes, respectively, and said retainer ring grooves are angularly related to the radius of said retainer ring so as to fittingly engage all of the radially inward portions of said spokes in one of said layers of spokes.

4. A method of fabricating wheel trim for a vehicle wheel including
    outer annular spoke retaining means,
    inner spoke containment means having a radial abutment surface and clamping means, and
    spokes extending generally radially between said inner containment means and outer retaining means,
    which comprises the steps of:
        mounting said outer retaining means on a fixture; positioning said clamping means and said containment means centrally with respect to said outer retaining means and in a plane spaced axially from their final assembled position relative to said outer retaining means;
        positioning each said spoke so that its radially outer end engages said outer retaining means, and its radially inner end is disposed within said clamping means against said radial abutment surface; and
        clamping the radially inner portions of said spokes to said containment means utilizing said clamping means to thereby cause said containment means, said radial abutment surfaces and said clamping means to move axially toward their final assembled position with said inner end of each spoke remaining fixed against said abutment surface whereby the radially outer ends of said spokes are forced against said outer retaining means.

5. A method of fabricating wheel trim for a vehicle wheel, as recited in claim 4, wherein said clamping means further comprises at least one annular spoke retainer ring having grooves extending across one support surface and wherein said positioning step is performed by positioning each spoke so that its radially outer end engages said outer retaining means and its radially inner end is set into a corresponding groove.

6. Wheel trim for attachment to the outer face of a vehicle wheel comprising:
    an annular retainer flange having means for engaging said vehicle wheel, said retainer flange having a spoke retainer flange portion with at least one annular array of a plurality of circumferentially spaced apertures;

at least one layer of a plurality of generally radially extending spoke elements, said spoke elements having radially outer portions inserted in said apertures, respectively;

a hub having a radially outwardly extending support flange, spoke retainer means comprising a pair of annular spoke retainer rings for each layer of said spoke elements positioned axially adjacent opposite sides of the radially inner portion of the corresponding layer of said spoke elements, one of said rings having a plurality of circumferentially spaced grooves on one support surface extending generally radially inwardly from the radially outer edge of said retainer ring to a radially inner spoke element abutment portion, each of said grooves engaging a radially inner portion of one of said spoke elements, each groove having a depth less than the axial dimension of the radially inner portion of the spoke element disposed therein; and fastener means to secure said radially inner portions of said spoke elements, said pair of spoke retainer rings and said hub together, said hub being supported solely by said spoke elements.

7. Wheel trim for attachment to the outer face of the vehicle wheel, said wheel trim comprising:

outer annular retaining means having means for engaging said vehicle wheel;

a plurality of generally radially extending spokes, having radially outer portions connected to said outer retaining means, respectively and having radially inner portions; and containment means disposed radially inwardly of said outer annular retaining means, said containment means comprising attachment means, and clamping means operably attached to said attachment means to secure together the radially inner portions of said spokes, said attachment means and said clamping means, said clamping means comprising at least one annular spoke retainer ring positioned axially adjacent to the radially inner portions of corresponding spokes and disposed axially oppositely from said attachment means, said annular spoke retainer ring having a plurality of circumferentially spaced grooves on a radially extending support surface which fittingly correspond to the radially inner portions of said corresponding spoke, said grooves extending from the radially outer edge of said retainer ring to a radially inner spoke abutment portion of said retainer ring, and fastener means securing together said spokes, said retainer ring, and said attachment means.

* * * * *